United States Patent [19]

Janecek

[11] 4,047,499
[45] Sept. 13, 1977

[54] PET WASTE DISPOSAL DEVICE

[76] Inventor: George Janecek, 1321 Scoville Ave., Berwyn, Ill. 60402

[21] Appl. No.: 673,701

[22] Filed: Apr. 5, 1976

[51] Int. Cl.² .......................................... A01K 29/00
[52] U.S. Cl. .................................................. 119/1
[58] Field of Search ......................................... 119/1

[56] References Cited

U.S. PATENT DOCUMENTS

| 3,744,453 | 7/1973 | Deitch | 119/1 |
| 3,745,974 | 7/1973 | Karasz | 119/1 |

*Primary Examiner*—Hugh R. Chamblee
*Attorney, Agent, or Firm*—Robert D. Farkas

[57] ABSTRACT

A pet waste disposal device to receive and discharge animal waste comprising a base having a resilient intermediate portion for folding the base to form a pouring channel. A wall is disposed about the base to keep the waste material from escaping the base. The wall is notched at both ends of the intermediate portion to ends of the intermediate portion to enable folding the device and provide an exiting aperture from the device.

4 Claims, 4 Drawing Figures

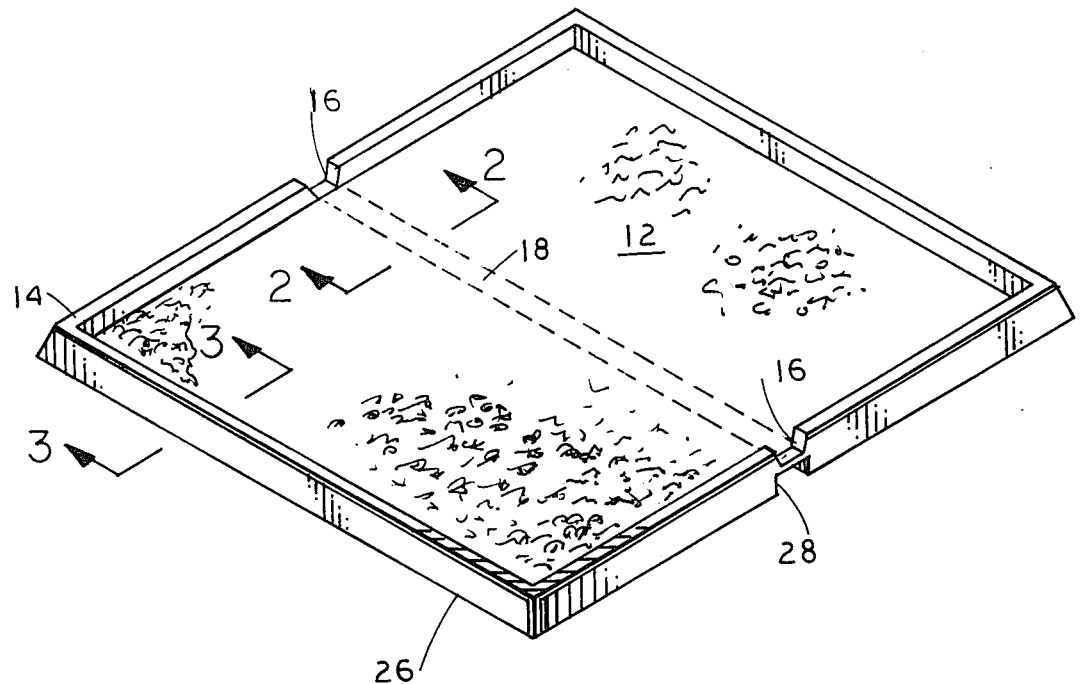
FIG. 1
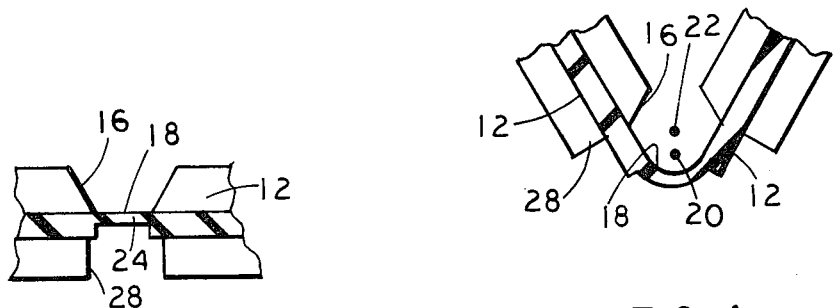
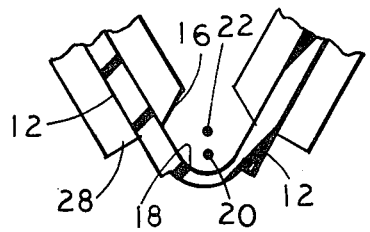
FIG. 4
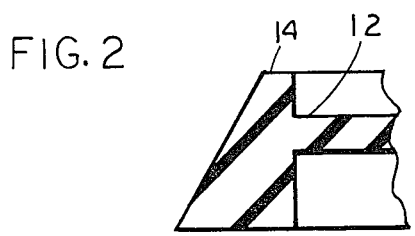
FIG. 2
FIG. 3

PET WASTE DISPOSAL DEVICE

BACKGROUND OF THE INVENTION

The present invention relates to a waste disposal device for a pet.

One type of pet waste disposal device that is known in the prior art provides means for collecting the waste. This tye of disposal device as disclosed in U.S. Pat. Nos. 3,233,588 to Thomas, 3,358,647 to Wilson, 3,745,974 to Karasz and 3,827,401 to Franzl makes no provision for effectively pouring the collected waste out of the device.

SUMMARY OF THE INVENTION

It is the principle object of this invention to provide a devise for receiving and disposing of pet waste that can be folded to form a pouring channel.

A further object is to make the device an integral structure for low manufacturing cost.

These and other objects are achieved by the preferred embodiment of the present invention which comprises a base having a resilient intermediate portion for fold about said intermediate portion and a wall around the periphery of the base to retain the waste material before disposal. The wall is notched at the ends of the intermediate portion portion so as not to interfere with folding and to provide an aperture through which waste can exit the device.

Having in mind the above and other objects that will be obvious from an understanding of the disclosure, the present invention comprises a combination and arrangement of parts illustrated in the presently preferred embodiments of the invention which are hereafter set forth in sufficient detail to enable those persons skilled in the art to clearly understand the function, operation, construction and advantages of it when read in conjunction with the accompanying drawing.

BRIEF DESCRIPTION OF THE DRAWING

The invention will be described in detail, by way of example, with reference to the accompanying drawing in which:

FIG. 1 is a pictorial view of the preferred embodiment utilizing the principles of the present invention;

FIG. 2 is a sectional view of the intermediate portion of the base taken along line 2—2 in FIG. 1;

FIG. 3 is a sectional view of the wall and flange taken along line 3—3 in FIG.1; and FIG. 4 is a sectional view similar to FIG. 2 but showing the device folded forming a pouring channel.

DETAILED DESCRIPTION OF THE INVENTION

Referring to FIG. 1 of the drawing, in accordance with the principles of the invention, a pet waste disposal device 10 is shown comprising a flat base 12 and a wall 14 having notches 16. A resilient intermediate portion 18 of the base 12 is provided to permit folding the device 10. Waste material deposit by a pet standing on the device 10 as it is being used is disposed of by folding the device 10 about the intermediate portion 18 as shown in FIG. 4 to form a pouring channel 20 for disposing of the waste.

The wall 14 is disposed around the periphery of the base 12 for preventing the waste material from escaping. The notches 16, which are located at opposite ends of the intermediate portion 18 enable folding and provide an aperture 22 for waste material that is passing along the pouring channel 20 to exit from the device 10.

FIG. 2 shows the intermediate portion 18 of the base 12 having a thinner cross section 24 than the remainder of the base thus facilitating folding.

FIG. 3 shows a flange 26 disposed peripherally around the base 12 to support the base off the floor. The flange 26 has a similar pair of notches 28 disposed at opposite ends of the intermediate portion to enable folding.

It is obvious from the illustrations that the device 10 can be made as an integral structure. Materials such as rubber or plastic can be use to fabricate the device 10 since there resilient types available of these materials.

While preferred and other embodiment of the invention are illustrated and/or described, it will be understood that the invention is in no way limited to these embodiments.

What is claimed is:

1. A pet waste disposal device comprising:
   a. A substantially planar base, having a resilient intermediate portion comprising a thinner cross section than the remainder of said base, for receiving waste material from a pet standing thereon during use and foldable about said intermediate portion to form a pouring channel; and
   b. A wall disposed about the periphery of said base extending above and below said base to prevent the waste material from escaping and to support the base, wherein said wall has notch means at opposite ends of said intermediate portion above and below said base to enable folding and to provide an aperture for waste material passing along the pouring channel to exit from the device.

2. The device according to claim 1, wherein said base and said wall comprise an integral structure.

3. The device according to claim 1, wherein the structure is rubber.

4. The device according to claim 1, wherein the structure is plastic.

* * * * *